United States Patent [19]

Nagasaki et al.

[11] Patent Number: 5,298,844
[45] Date of Patent: Mar. 29, 1994

[54] WORK HOLDING DEVICE

[75] Inventors: Hideo Nagasaki, Tokyo; Shoichi Hayashi, Chiba; Naruhiko Abe; Tsuyoshi Inoue, both of Kanagawa, all of Japan

[73] Assignee: Sony Corporation, Japan

[21] Appl. No.: 835,350

[22] Filed: Feb. 14, 1992

[30] Foreign Application Priority Data

Feb. 19, 1991 [JP] Japan .................. 3-045505

[51] Int. Cl.⁵ ............................................. B25J 19/00
[52] U.S. Cl. .............................. 318/568.11; 318/578; 29/26 A; 408/35
[58] Field of Search ............................ 318/560–646; 364/474.01–474.32; 29/26; 408/35

[56] References Cited

U.S. PATENT DOCUMENTS

| | | | |
|---|---|---|---|
| 3,849,712 | 11/1974 | Lankford et al. | 318/561 |
| 3,976,928 | 8/1976 | Wenzel | 318/578 |
| 4,203,064 | 5/1980 | Suzuki et al. | 318/640 |
| 4,628,441 | 12/1986 | Johnstone et al. | 318/603 X |
| 4,639,653 | 1/1987 | Anderson et al. | 318/599 |
| 4,656,726 | 4/1987 | Suzuki et al. | |
| 4,674,928 | 6/1987 | Lyman | 318/568 X |
| 4,738,572 | 4/1988 | Kitamura | |
| 4,923,054 | 5/1990 | Ohtani et al. | 187/25 |
| 4,941,374 | 7/1990 | Focke | 414/793 X |
| 5,020,201 | 6/1991 | Kitamura | 29/27 C |
| 5,081,889 | 1/1992 | Takano et al. | 82/122 |
| 5,094,381 | 3/1992 | Amos et al. | 228/6.2 |
| 5,162,659 | 11/1992 | Diamond et al. | 250/560 |

FOREIGN PATENT DOCUMENTS

| | | |
|---|---|---|
| 0090357A3 | 5/1983 | European Pat. Off. |
| 2739810A1 | 3/1978 | Fed. Rep. of Germany |
| 3511614A1 | 3/1985 | Fed. Rep. of Germany |

Primary Examiner—Paul Ip
Attorney, Agent, or Firm—Ronald P. Kananen

[57] ABSTRACT

A work holding device is intended for use in combination with a processing machine, such as an assembling apparatus, an industrial robot or a machine tool. The work holding device comprises a base plate (8), a slide base (9) supported for vertical movement on the base plate (8), a swivel head (10) supported for turning on the slide base (9), and a rotary table (11) supported on the swivel head for rotation about an axis perpendicular to the axis of turning of the swivel head. The slide base (9), the swivel head (10) and the rotary table (11) are controlled properly to set a work (12) held on the rotary table (11) in an optional position relative to the associated processing machine. The work holding device and the processing machine are controlled for synchronous operation by a single controller according to a control program.

3 Claims, 9 Drawing Sheets

WORK HOLDING DEVICE

BACKGROUND OF THE INVENTION

1. Field of the Invention

The present invention relates to a novel work holding device and, more specifically, to a work holding device that enables a work to be set for machining or assembling in an optional position relative to a tool.

2. Description of the Prior Art

FIG. 10 shows, by way of example, a conventional work holding device in combination with an industrial robot for machining a work held by the work holding device or joining parts to the same.

A horizontal articulated robot a has an arm b, and a tool holding shaft c supported for rotation and axial movement on the free end of the arm b. Tools d are held on the lower end of the tool holding shaft c. A conveying device e is disposed under the operating region of the articulated robot a to convey a work f mounted on a work mount g through the operating region of the articulated robot a. The tool holding shaft c is lowered to machine the work f with the tools d.

This work holding device has the work mount g merely fixedly holding the work f and the work mount g cannot be tilted with respect to a processing direction along which the articulated robot a moves the tools d. Therefore, the articulated robot a is unable to gain access to the lateral side of the work f, for example, for fastening a screw to the lateral side of the work f. Accordingly, it has been a practice to design a work so that the work does not require a lateral processing operation in joining parts to the work or in machining the work. However, it requires a greater amount of time to design a work to take conditions into consideration for eliminating the lateral processing operations. Moreover, it is difficult to process a work designed to meet multiple purposes along limited processing directions.

SUMMARY OF THE INVENTION

Accordingly, it is an object of the present invention to provide a work holding device capable of setting a work in an optional position suitable for assembling or machining.

In one aspect of the present invention, a work holding device comprises a vertical base plate, a slide base supported for vertical movement on the front surface of the vertical base plate, an L-shaped swivel head supported for rotation on the slide base, and a rotary table supported for rotation on one end of the rotary block.

The work holding device, in accordance with the present invention, does not place restrictions on the processing direction of an industrial robot or the like, enables processing a work in many directions, does not place restrictions related to the processing direction on the design of the work, enables the curtailment of time for designing the work, and increases the degree of freedom of design.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
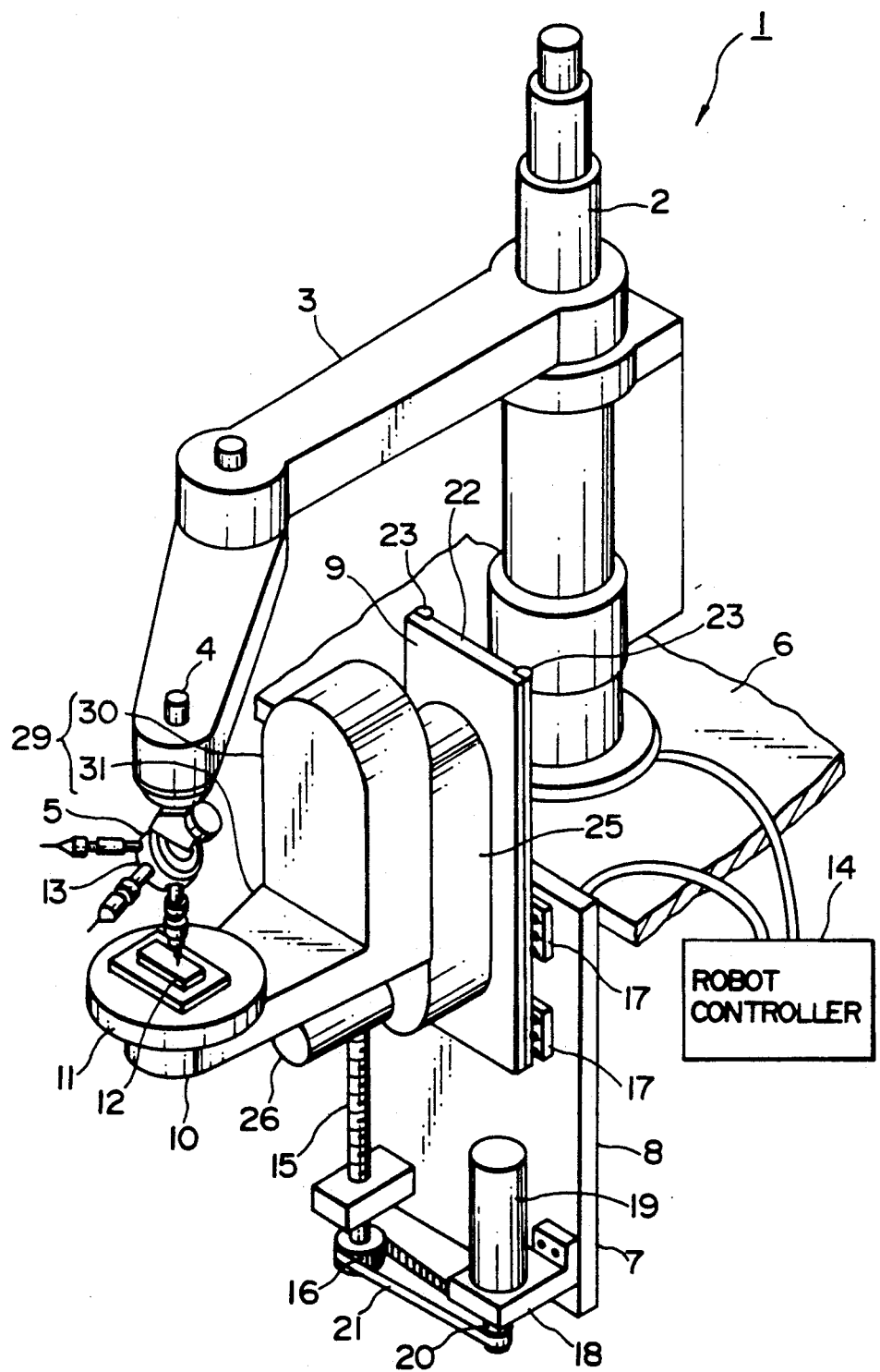
FIG. 1 is a schematic perspective view of an assembling apparatus comprising, in combination, a horizontal articulated robot provided with a turret tool head and a work holding device in a preferred embodiment according to the present invention.
Figure 2:
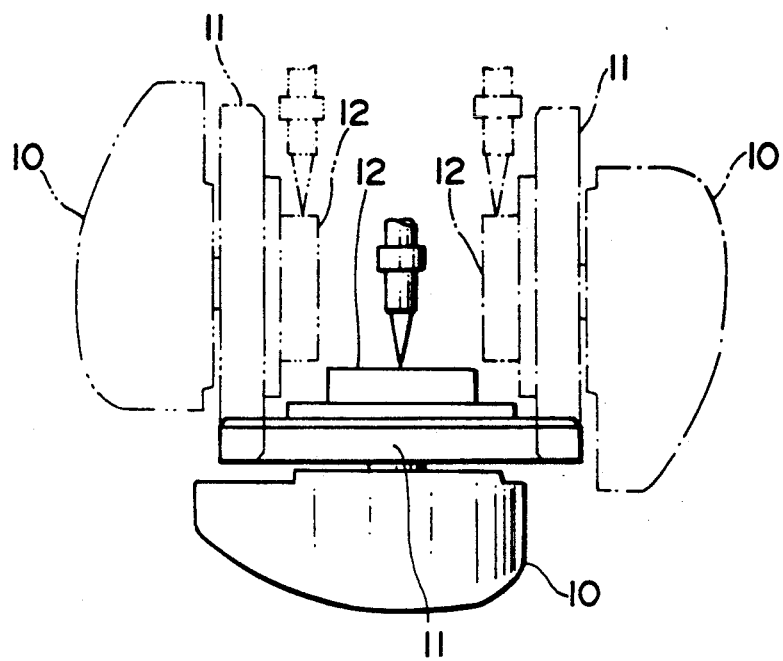
FIG. 2 is a fragmentary, schematic front view of the assembling appearance of FIG. 1 for of assistance in explaining a manner of setting a work in different positions relative to a tool.
Figure 3:
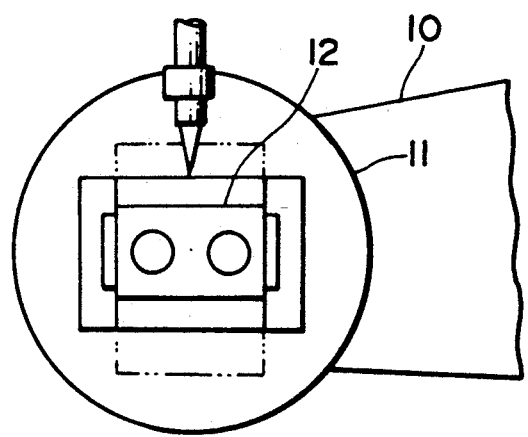
FIG. 3 is a fragmentary plan view of the assembling apparatus of FIG. 1, showing a manner of setting a work in different positions relative to a tool.

An assembling apparatus comprising, in combination, a work holding device in a preferred embodiment according to the present invention and a horizontal articulated robot will be described briefly with reference to FIGS. 1 to 4 prior to the detailed description of the work holding device.

Referring to FIGS. 1 to 4, an assembling apparatus 1 comprises a horizontal articulated robot 2 provided with a turret tool head 13 and a work holding device 7. The articulated robot 2 and the work holding device 7 are controlled synchronously for cooperative operation by a robot controller 14 according to a robot control program. The articulated robot 2 has an arm 3 and a tool holding shaft 4 supported for rotation and axial movement on the free end of the arm 3. The articulated robot 2 is installed fixedly on a bed 6.

The work holding device 7 has a base plate 8 fixed at its upper end to the bed 6 so as to extend vertically therefrom. A slide base 9 is supported for vertical movement on the front surface of the base plate 8. A swivel head 10 is supported for turning in a vertical plane about a horizontal axis on the front surface of the slide base 9. A rotary table 11 is supported for rotation about an axis perpendicular to the axis of turning of the swivel head 10 on the upper surface of the arm section 31 of the swivel head 10. A work mount supporting a work 12 is held on the rotary table 11.

In processing the work 12 held on the rotary table 11 (indicated by continuous lines in FIG. 2) by the articulated robot 2, the work 12 can be processed from above the same. When the flank of the work 12 needs to be subjected to processing for lateral processing, the swivel head 10 is turned on the slide base 9 to set the work 12 in a position indicated by the alternate long and two short dashed lines or in a position indicated by the alternate long and short dashed lines in FIG. 2. The positions of the work 12 are not limited to those indicated by the continuous lines, alternate long and two short dashed lines and the alternate long and short dashed lines; the work 12 can be set in any position between the position indicated by the continuous lines and the position indicated by the alternate long and two short dashed lines and between the position indicated by the continuous lines and the position indicated by the alternate long and short dashed lines by turning the swivel head 10 to an appropriate angular position. The diversity of positions of the work 12 can be enhanced by turning the rotary table 11 relative to the swivel head 10 in addition to the turning of the swivel head 10 about the horizontal axis. For example, the work 12 held in a position indicated by the continuous lines in FIG. 3 corresponding to the right side view of the same in the position indicated by the alternate long and two short dashed lines in FIG. 2 can be set in an optional position between the position indicated by the continuous lines and the position indicated by the alternate long and two short dashed lines in FIG. 3 by turning the rotary table 11 to a corresponding angular position.

Figure 4:
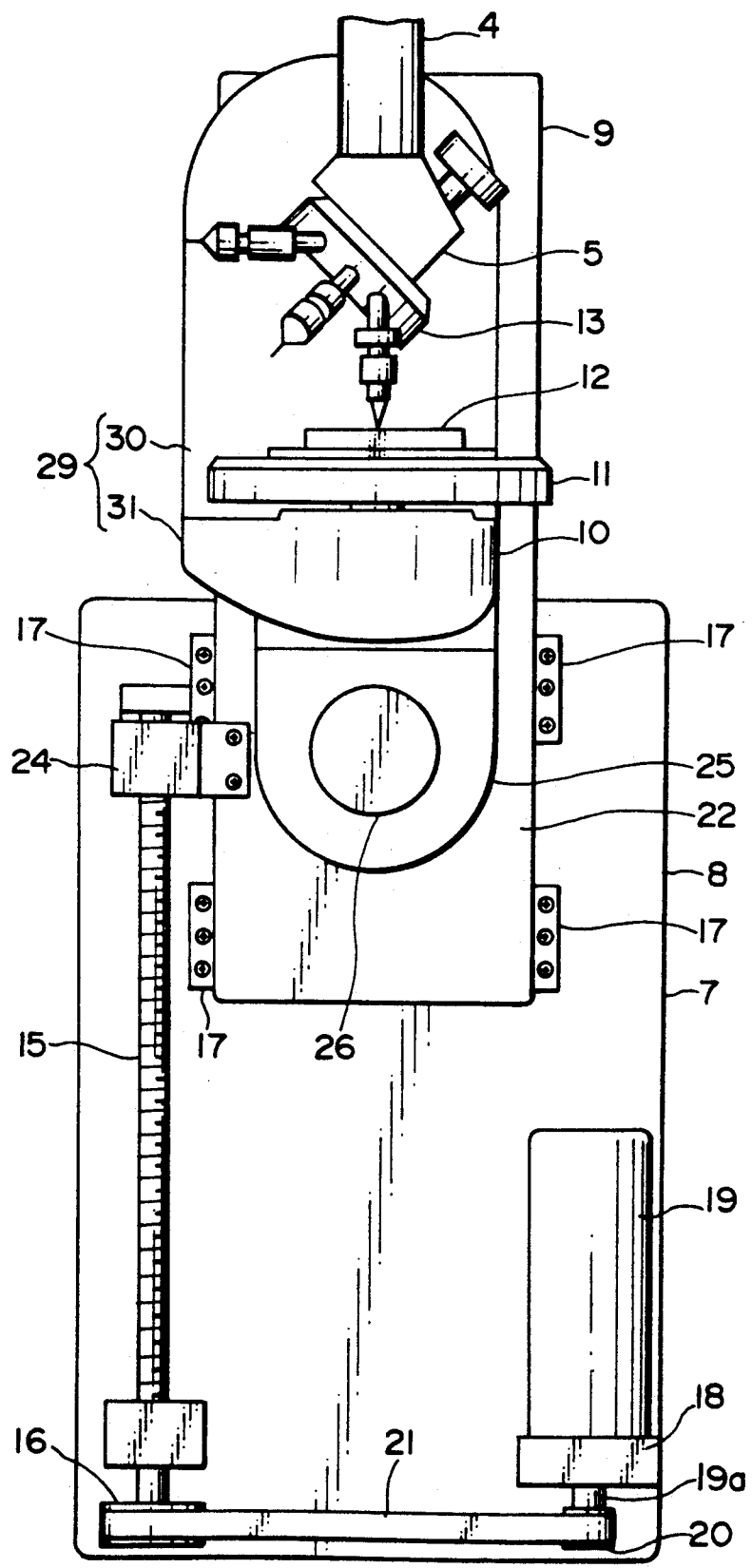
FIG. 4 is a schematic front view of the assembling apparatus of FIG. 1.
Figure 5:
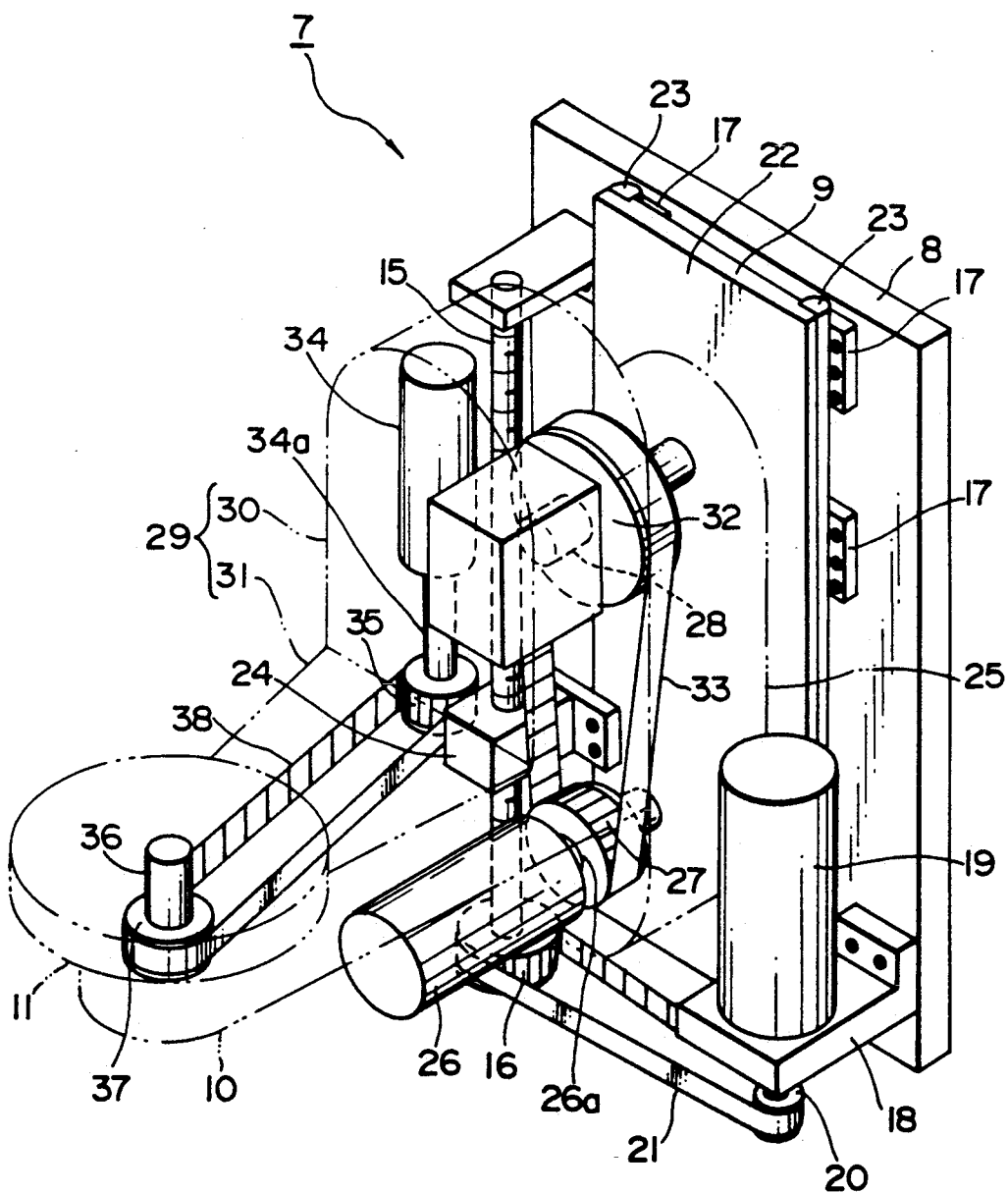
FIG. 5 is a schematic perspective view of the work holding device of FIG. 1.

The slide base 9 is moved vertically in changing the position of the work 12, in changing a tool of a plurality of tools held on the turret tool head 13 held on the tool holding shaft 4 as shown in FIG. 4 for another one or in adjusting the position of the work 12 relative to the tool.

The rotary table 11 is provided with compressed air piping, a work holding means, sensors for detecting the position of the work 12 and the operating condition of the associated mechanisms and wiring for the sensors, which are not shown in the drawings.

The work holding device 7 will be described in detail hereinafter.

Figure 6:
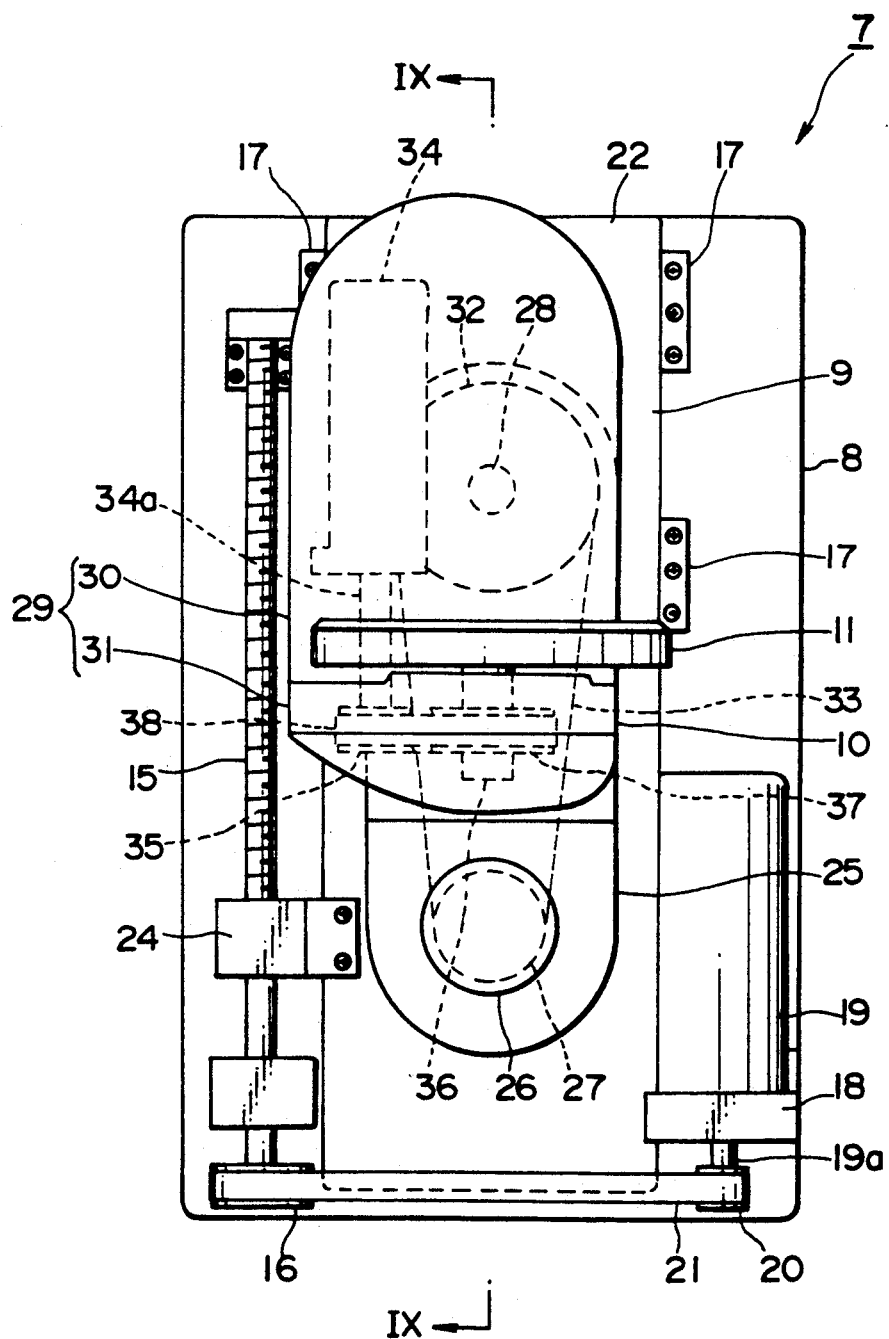
FIG. 6 is a schematic front view of the work holding device of FIG. 1.
Figure 7:
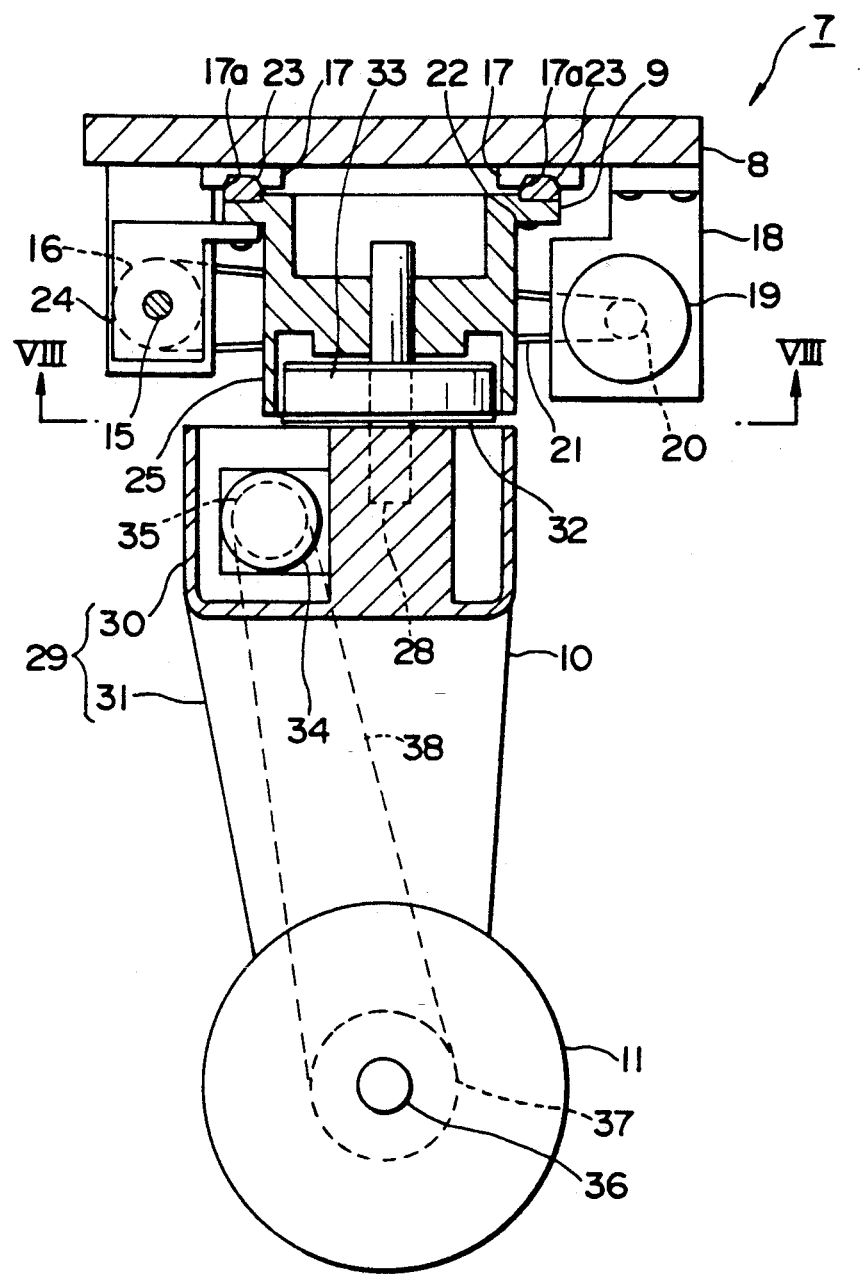
FIG. 7 is a sectional plan view of the work holding device of FIG. 1.
Figure 8:
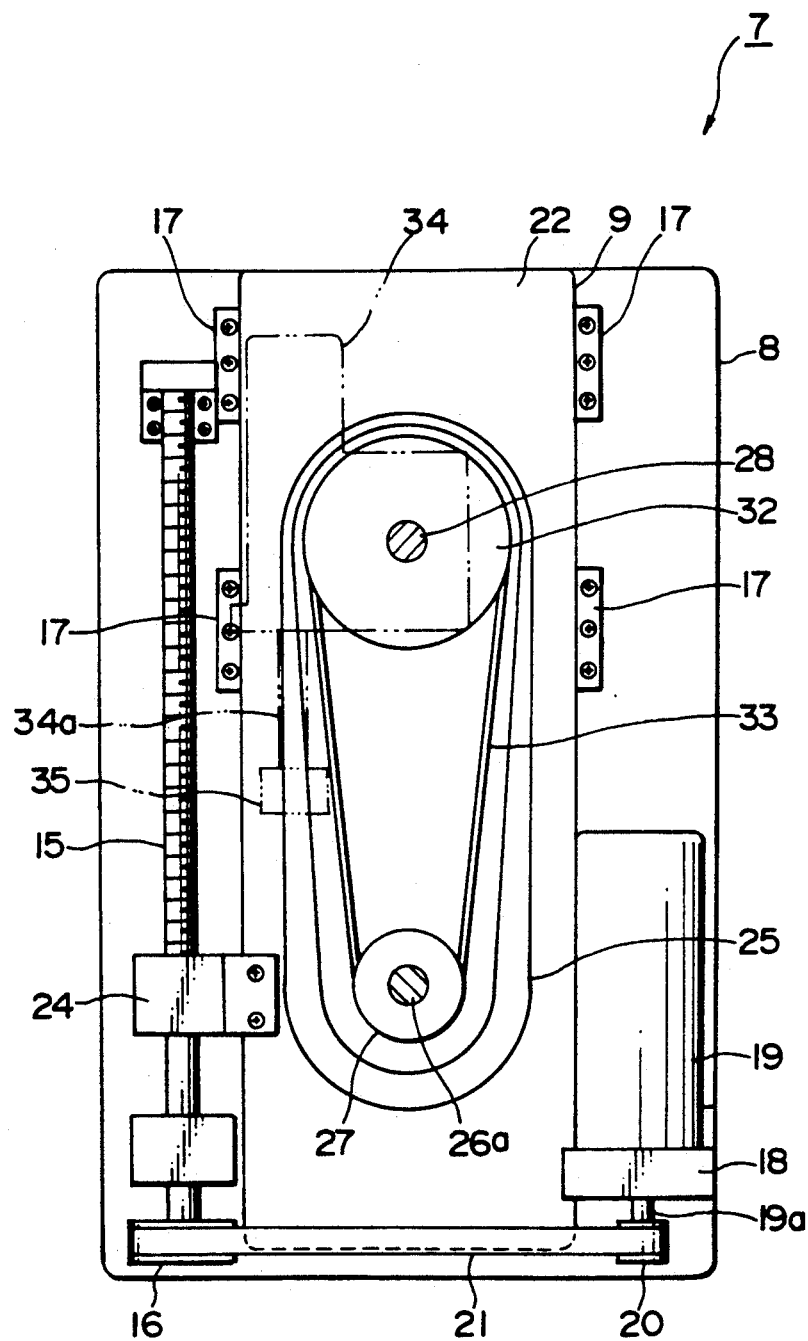
FIG. 8 is a sectional view taken on line VIII—VIII in FIG. 7.
Figure 9:
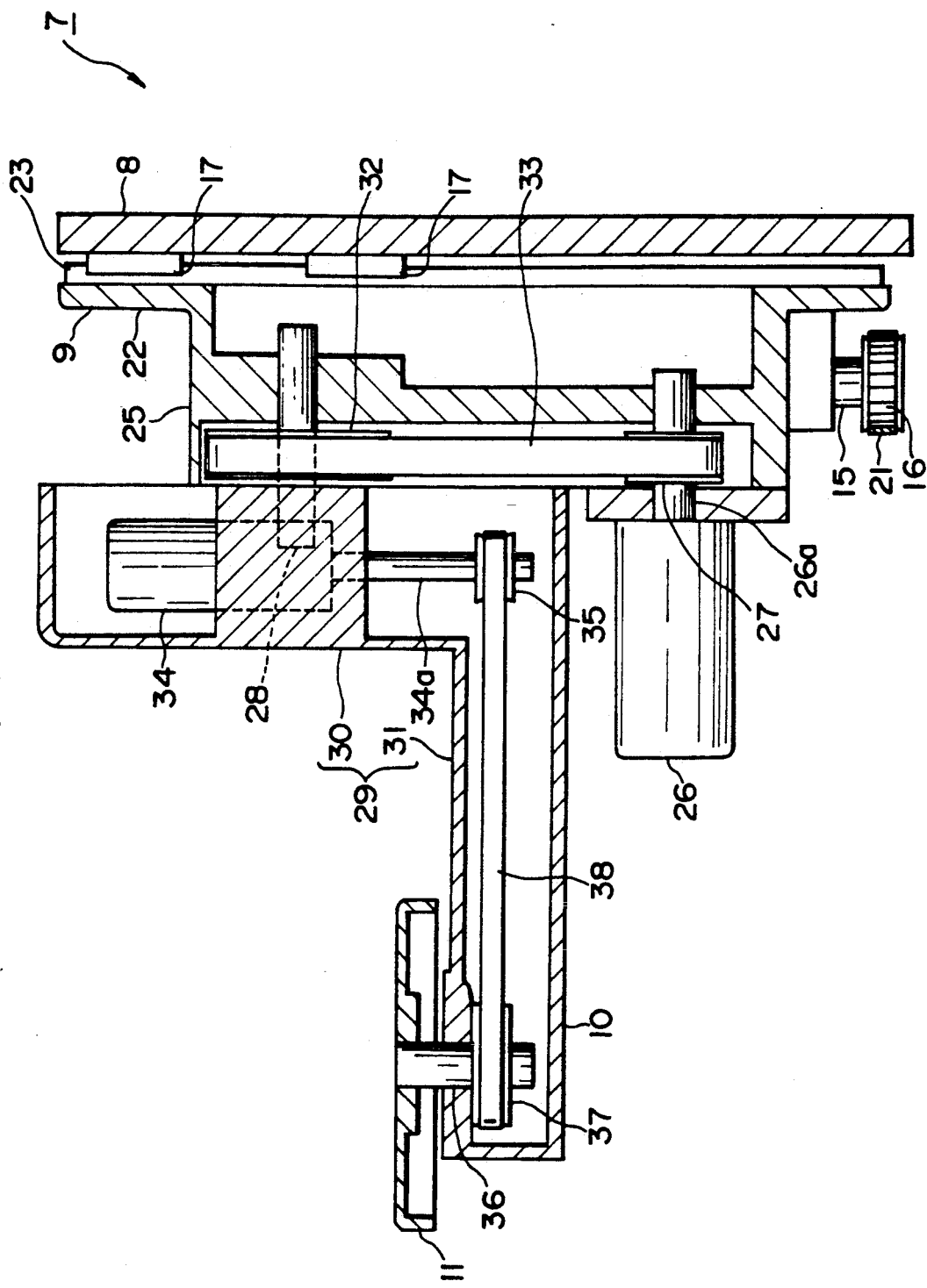
FIG. 9 is a sectional view taken on line IX—IX in FIG. 6.
Figure 10:
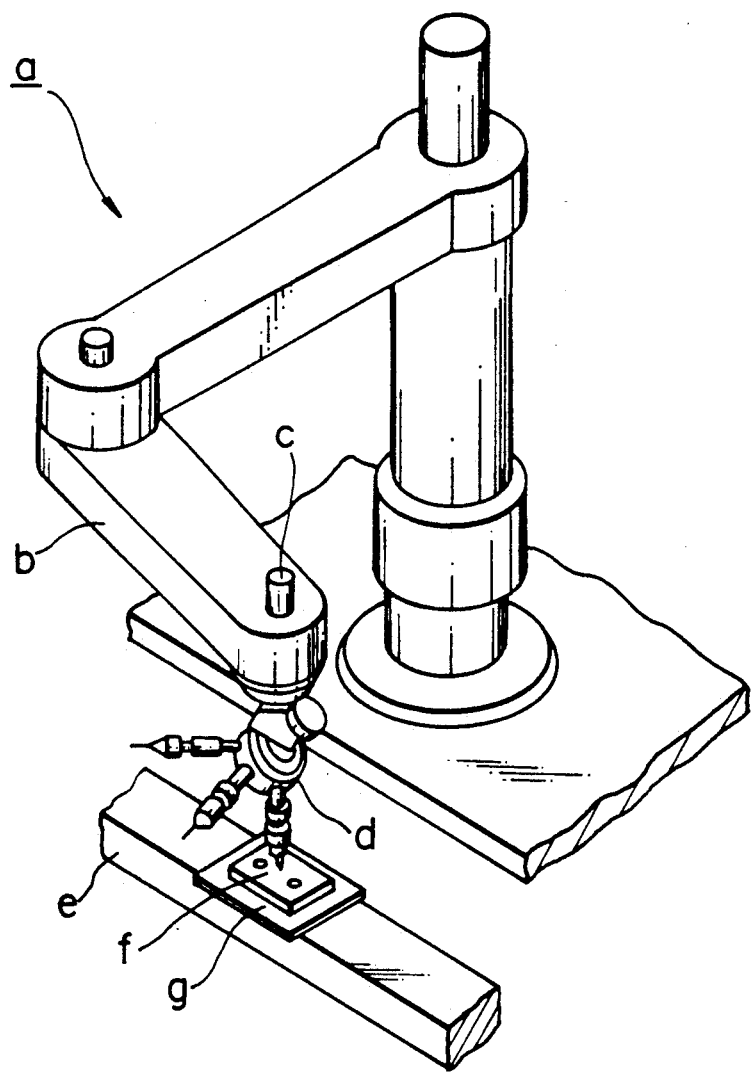
FIG. 10 is a schematic perspective view of a conventional assembling apparatus comprising, in combination, an industrial robot provided with a turret tool head and a conventional work holding device.

Referring to FIGS. 5 to 9, a screw rod 15 is journaled at its upper end and in a portion near its lower end on the left-hand portion of the front surface of the base plate 8. A driven toothed pulley 16 is fixed to the lower end of the screw rod 15. A bracket 18 is attached to the base plate 8 at a position near the lower end of the base plate 8 so as to project to the front, and a motor 19 is fixedly held on the bracket 18 with its output shaft 19a projecting downwardly from the bracket 18. A driving toothed pulley 20 is fixed to the output shaft 19a and an endless timing belt 21 is extended between the driven toothed pulley 16 and the driving toothed pulley 20. As shown in FIG. 6, an internally threaded block or nut, 24 is fixed to the left side of the slide base 9 and is in engagement with the screw rod 15.

Thin guide blocks 17, provided respectively with guide grooves 17a in their front surfaces, are fixed to the front surface of the base plate 8 respectively at an upper right-hand position, an upper left-hand position, a lower right-hand position and a lower left-hand position with their guide grooves 17a vertically extended. Rails 23 are fixed to the back surface of the slide base 9 respectively along the opposite sides thereof. The rails 23 are received in the guide grooves 17a for vertical sliding movement along the guide grooves 17a. The cross section of the rails 23 is complementary to that of the guide grooves 17a.

The rotation of the output shaft 19a of the motor 19 is transmitted through the driving toothed pulley 20, the timing belt 21 and the driven toothed pulley 16 to the screw rod 15 to move the internally threaded block, or nut 24 engaging the screw rod 15 upwardly or downwardly according to the direction of rotation of the output shaft 19a of the motor 19, so that the slide base 9 is moved upward or downwardly according to the direction of rotation of the output shaft 19a of the motor 19.

A vertically elongated support block 25 is fixed to the front surface of the slide base 9. A motor 26 is fixed to the lower end of the support block 25 with its axis extended horizontally. A driving toothed pulley 27 is fixed to the output shaft 26a of the motor 26. A support shaft 28 is projected to the front from the support block 25 from a position near the upper end of the support block 25.

A boxed-shaped member 29 for the swivel block 10 has a vertical main section 30 and an arm section 31 projecting to the front from the lower end of the main section 30 in an integral construction. The arm section 31 is tapered toward its front end. The main section 30 is journaled in its substantially central portion on the front portion of the support shaft 28 provided on the slide base 9. A driven toothed pulley 32 is fixed to the substantially central portion of the back surface of the main section 30 coaxially with the support shaft 28 so as to surround the front end of a portion of the support block 25 supporting the support shaft 28. An endless timing belt 33 is extended between the driving toothed pulley 27 and the driven toothed pulley 32 to transmit the rotation of the output shaft 26a of the motor 26 through the driven toothed pulley 32 to the swivel block 10 to turn the swivel block 10 about a horizontal axis.

A motor 34 is fixed to the arm section 31 at a position near the main section 30 with its axis in a vertical position. The output shaft 34a of the motor 34 projects downwardly from the arm section 31 and a driving toothed pulley 35 is fixed to the output shaft 34a. A rotary shaft 36 is journaled in a vertical position on the front end of the arm section 31, and a driven toothed pulley 37 is fixed to a portion of the rotary shaft 36 projecting downwardly from the arm section 31. An endless timing belt 38 is extended between the driving toothed pulley 35 and the driven toothed pulley 37.

The rotary table 11 is fixed to the upper end of the rotary shaft 36 projecting upwardly from the arm section 31. The motor 34 drives the rotary shaft 36 for rotation through the driving toothed pulley 35, the timing belt 38 and the driven toothed pulley 37 to rotate the rotary table 11.

The operation of the two motors 26 and 34 is controlled properly to set the work 12 held on the rotary table 11 in an optional position, so that the work 12 can be processed from different directions. When necessary, the motor 19 is driven to change the height of the work 12 relative to the articulated robot 2.

The shapes and construction of the parts and mechanisms employed in the foregoing embodiment are intended to illustrate the invention by way of example and are not to be construed to limit the technical scope of the present invention.

Although the invention has been described in its preferred form with a certain degree of particularity, obviously many changes and variations are possible therein. It is therefore to be understood that the present invention may be practiced otherwise than as specifically described herein without departing from the spirit and scope thereof.

What is claimed is:

1. A work holding device comprising:
   a base plate set in a vertical position;
   a slide base supported for vertical movement on a front surface of said base plate;
   an L-shaped swivel head having a main section extending in parallel to said slide base and an arm section extending horizontally to the front from the main section;

means for selectively rotating said swivel head about an axis which is essentially horizontal and which passes through both of the main section of said L-shaped swivel head and said slide base;

a rotary table supported for rotation on the extremity of the arm section of said swivel head, and a side base moving means comprising:
a first motor mounted on said base plate,
a screw rod journaled on said base plate,
a first driving toothed pulley fixed to an output shaft of said first motor,
a first driven toothed pulley fixed to one end of said screw rod,
a first timing belt extended between said first driving toothed pulley and the said first driven toothed pulley for establishing a drive connection therebetween, and
a nut fixed to said slide base and threadedly engaged said screw rod;

wherein said swivel head rotating means comprises:
a second motor mounted on said slide base,
a second driving toothed pulley fixed to an output shaft of said second motor,
a second driven toothed pulley fixed to the main section of said L-shaped swivel head coaxially with the axis about which said swivel head is rotatable, and a second timing belt extended between said second driving toothed pulley and said second driven toothed pulley; and a table rotating means comprising:
a third motor mounted on said swivel head,
a third driving toothed pulley fixed to an output shaft of said third motor,
a third driven toothed pulley fixed to a shaft of said rotary table, and
a third timing belt extended between said third driving toothed pulley and said third driven toothed pulley.

2. A work holding device according to claim 1, wherein said base plate is fixed vertically to a horizontal base on which one of an assembling apparatus, an industrial robot and a machine tool is installed.

3. A working holding device according to claim 1, wherein said slide plate moving means, said swivel head turning means, and said table rotating means are controlled by a controller which controls at least one of an assembling apparatus, an industrial robot or machine tool, and a work holding device, according to a control program.

* * * * *